US008225408B2

(12) United States Patent
Rubin et al.

(10) Patent No.: US 8,225,408 B2
(45) Date of Patent: Jul. 17, 2012

(54) METHOD AND SYSTEM FOR ADAPTIVE RULE-BASED CONTENT SCANNERS

(75) Inventors: Moshe Rubin, Jerusalem (IL); Moshe Matitya, Jerusalem (IL); Artem Melnick, Beit Shemesh (IL); Shlomo Touboul, Kefar-Haim (IL); Alexander Yermakov, Beit Shemesh (IL); Amit Shaked, Tel Aviv (IL)

(73) Assignee: Finjan, Inc., San Jose, CA (US)

( * ) Notice: Subject to any disclaimer, the term of this patent is extended or adjusted under 35 U.S.C. 154(b) by 1298 days.

(21) Appl. No.: 10/930,884

(22) Filed: Aug. 30, 2004

(65) Prior Publication Data

US 2005/0108554 A1 May 19, 2005

Related U.S. Application Data

(63) Continuation-in-part of application No. 09/539,667, filed on Mar. 30, 2000, now Pat. No. 6,804,780, which is a continuation of application No. 08/964,388, filed on Nov. 6, 1997, now Pat. No. 6,092,194.

(51) Int. Cl.
*H04L 29/06* (2006.01)

(52) U.S. Cl. ............................. 726/25; 713/153; 726/22

(58) Field of Classification Search ........................ None
See application file for complete search history.

(56) References Cited

U.S. PATENT DOCUMENTS

| 5,077,677 A | 12/1991 | Murphy et al. |
| 5,359,659 A | 10/1994 | Rosenthal |
| 5,361,359 A | 11/1994 | Tajalli et al. |
| 5,414,833 A * | 5/1995 | Hershey et al. ................. 726/22 |
| 5,485,409 A | 1/1996 | Gupta et al. |
| 5,485,575 A | 1/1996 | Chess et al. |
| 5,572,643 A | 11/1996 | Judson |
| 5,579,509 A | 11/1996 | Furtney et al. |
| 5,606,668 A | 2/1997 | Shwed |
| 5,623,600 A | 4/1997 | Ji et al. |
| 5,638,446 A | 6/1997 | Rubin |
| 5,675,711 A * | 10/1997 | Kephart et al. ................. 706/12 |

(Continued)

FOREIGN PATENT DOCUMENTS

EP 1091276 A1 4/2001

(Continued)

OTHER PUBLICATIONS

D Grune, C Jacobs, K Langendoen, H Bal—Parsing Techniques: A Practical Guide, 2000—John Wiley & Sons, Inc. New York, NY, USA, p. 1-326.*

(Continued)

*Primary Examiner* — Eleni Shiferaw
*Assistant Examiner* — Jeffery Williams
(74) *Attorney, Agent, or Firm* — Dawn-Marie Bey; King & Spalding LLP

(57) ABSTRACT

A method for scanning content, including identifying tokens within an incoming byte stream, the tokens being lexical constructs for a specific language, identifying patterns of tokens, generating a parse tree from the identified patterns of tokens, and identifying the presence of potential exploits within the parse tree, wherein said identifying tokens, identifying patterns of tokens, and identifying the presence of potential exploits are based upon a set of rules for the specific language. A system and a computer readable storage medium are also described and claimed.

35 Claims, 7 Drawing Sheets

U.S. PATENT DOCUMENTS

| | | | |
|---|---|---|---|
| 5,692,047 A | 11/1997 | McManis | |
| 5,692,124 A | 11/1997 | Holden et al. | |
| 5,720,033 A | 2/1998 | Deo | |
| 5,724,425 A | 3/1998 | Chang et al. | |
| 5,740,248 A | 4/1998 | Fieres et al. | |
| 5,740,441 A * | 4/1998 | Yellin et al. | 717/134 |
| 5,761,421 A | 6/1998 | van Hoff et al. | |
| 5,765,205 A | 6/1998 | Breslau et al. | |
| 5,784,459 A | 7/1998 | Devarakonda et al. | |
| 5,796,952 A | 8/1998 | Davis et al. | |
| 5,805,829 A | 9/1998 | Cohen et al. | |
| 5,832,208 A | 11/1998 | Chen et al. | |
| 5,832,274 A | 11/1998 | Cutler et al. | |
| 5,850,559 A | 12/1998 | Angelo et al. | |
| 5,859,966 A | 1/1999 | Hayman et al. | |
| 5,864,683 A | 1/1999 | Boebert et al. | |
| 5,881,151 A * | 3/1999 | Yamamoto | 726/24 |
| 5,884,033 A * | 3/1999 | Duvall et al. | 709/206 |
| 5,892,904 A | 4/1999 | Atkinson et al. | |
| 5,951,698 A | 9/1999 | Chen et al. | |
| 5,956,481 A | 9/1999 | Walsh et al. | |
| 5,963,742 A | 10/1999 | Williams | 717/143 |
| 5,974,549 A | 10/1999 | Golan | |
| 5,978,484 A | 11/1999 | Apperson et al. | |
| 5,983,348 A * | 11/1999 | Ji | 726/13 |
| 5,987,611 A | 11/1999 | Freund | 726/4 |
| 6,088,801 A * | 7/2000 | Grecsek | 726/1 |
| 6,088,803 A * | 7/2000 | Tso et al. | 726/22 |
| 6,092,194 A | 7/2000 | Touboul | |
| 6,154,844 A | 11/2000 | Touboul | |
| 6,167,520 A | 12/2000 | Touboul | |
| 6,339,829 B1 | 1/2002 | Beadle et al. | |
| 6,425,058 B1 | 7/2002 | Arimilli et al. | 711/134 |
| 6,434,668 B1 | 8/2002 | Arimilli et al. | 711/128 |
| 6,434,669 B1 | 8/2002 | Arimilli et al. | 711/128 |
| 6,480,962 B1 | 11/2002 | Touboul | |
| 6,487,666 B1 | 11/2002 | Shanklin et al. | 726/23 |
| 6,519,679 B2 | 2/2003 | Devireddy et al. | 711/114 |
| 6,598,033 B2 | 7/2003 | Ross et al. | 706/46 |
| 6,732,179 B1 | 5/2004 | Brown et al. | 709/229 |
| 6,804,780 B1 | 10/2004 | Touboul | |
| 6,917,953 B2 | 7/2005 | Simon et al. | 707/204 |
| 7,058,822 B2 | 6/2006 | Edery et al. | 726/22 |
| 7,143,444 B2 * | 11/2006 | Porras et al. | 726/30 |
| 7,210,041 B1 * | 4/2007 | Gryaznov et al. | 713/188 |
| 7,308,648 B1 * | 12/2007 | Buchthal et al. | 715/234 |
| 7,343,604 B2 * | 3/2008 | Grabarnik et al. | 719/313 |
| 7,418,731 B2 | 8/2008 | Touboul | 726/22 |
| 2003/0014662 A1* | 1/2003 | Gupta et al. | 713/200 |
| 2003/0074190 A1* | 4/2003 | Allison | 704/10 |
| 2003/0101358 A1* | 5/2003 | Porras et al. | 713/201 |
| 2004/0073811 A1* | 4/2004 | Sanin | 713/201 |
| 2004/0088425 A1* | 5/2004 | Rubinstein et al. | 709/230 |
| 2005/0050338 A1* | 3/2005 | Liang et al. | 713/188 |
| 2005/0172338 A1* | 8/2005 | Sandu et al. | 726/22 |
| 2006/0031207 A1* | 2/2006 | Bjarnestam et al. | 707/3 |
| 2006/0048224 A1* | 3/2006 | Duncan et al. | 726/22 |
| 2008/0066160 A1* | 3/2008 | Becker et al. | 726/4 |
| 2010/0195909 A1 | 8/2010 | Wasson et al. | 382/176 |

FOREIGN PATENT DOCUMENTS

| | | |
|---|---|---|
| EP | 1132796 A1 | 9/2001 |
| WO | WO 2004/063948 | 7/2004 |

OTHER PUBLICATIONS

Power, James, "Notes on Formal Language Theory and Parsing", 1999, National University of Ireland, p. 1-40.*

Scott et al., "Abstracting Application-Level Web Security", 2002, ACM, p. 396-407.*

U.S. Appl. No. 10/838,889, filed Oct. 26, 1999, Golan , G.

http://www.codeguru.com/Cpp/Cpp/cpp_mfc/parsing/article.php/c4093/.

http://www.cs.may.ie/~jpower/Courses/compilers/notes/lexical.pdf.

http://www.mail-archive.com/kragen-tol@canonical.org/msg00097.html.

http://www.owlnet.rice.edu/~comp412/Lectures/L06LexWrapup4.pdf.

http://www.cs.odu.edu/~toida/nerzic/390teched/regular/fa/min-fa.html.

http://rw4.cs.uni-sb.de/~ganimal/GANIFA/page16_e.htm.

http://www.cs.msstate.edu/~hansen/classes/3813fall01/slides/06Minimize.pdf.

http://www.win.tue.nl/~watson/2R870/downloads/madfa_algs.pdf.

http://www.cs.nyu.edu/web/Research/Theses/chang_chia-hsiang.pdf.

"Products" Article published on the Internet, "Revolutionary Security for a New Computing Paradigm" regarding SurfinGate™ 7 pages.

"Release Notes for the Microsoft ActiveX Development Kit", Aug. 13, 1996, activex.adsp.or.jp/inetsdk/readme.txt, pp. 1-10.

Doyle et al., "Microsoft Press Computer Dictionary" 1993, Microsoft Press, $2^{nd}$ Edition, pp. 137-138.

Finjan Software Ltd., "Powerful PC Security for the New World of Java™ and Downloadables, Surfin Shield™" Article published on the Internet by Finjan Software Ltd., 1996, 2 pages.

Finjan Software Ltd., "Finjan Announces a Personal Java™ Firewall for Web Browsers—the SurfinShield™ 1.6 (formerly known as SurfinBoard)", Press Release of Finjan Releases SurfinShield 1.6, Oct. 21, 1996, 2 pages.

Finjan Software Ltd., "Finjan Announces Major Power Boost and New Features for SurfinShield™ 2.0" Las Vegas Convention Center/Pavilion 5 P5551, Nov. 18, 1996, 3 pages.

Finjan Software Ltd., "Finjan Software Releases SurfinBoard, Industry's First JAVA Security Product for the World Wide Web", Article published on the Internet by Finjan Software Ltd., Jul. 29, 1996, 1 page.

Finjan Software Ltd., "Java Security: Issues & Solutions" Article published on the Internet by Finjan Software Ltd., 1996, 8 pages.

Finjan Software Ltd., Company Profile "Finjan—Safe Surfing, The Java Security Solutions Provider" Article published on the Internet by Oct. 31, 1996, 3 pages.

IBM Antivirus User's Guide Version 2.4, International Business Machines Corporation, Nov. 15, 1995, p. 6-7.

Khare, R. "Microsoft Authenticod Analyzed" Jul. 22, 1996, xent.com/FoRK-archive/smmer96/0338.html, p. 1-2.

LaDue, M., "Online Business Consultant: Java Security: Whose Business Is It?" Article published on the Internet, Home Page Press, Inc. 1996, 4 pages.

Leach, Norvin et al., "IE 3.0 Applets Will Earn Certification", PC Week, vol. 13, No. 29, Jul. 22, 1996, 2 pages.

Moritz, R., "Why We Shouldn't Fear Java" Java Report, Feb. 1997, pp. 51-56.

Microsoft—"Microsoft ActiveX Software Development Kit" Aug. 12, 1996, activex.adsp.or.jp/inetsdk/help/overview.htm, pp. 1-6.

Microsoft Corporation, Web Page Article "Frequently Asked Questions About Authenticode", last updated Feb. 17, 1997, Printed Dec. 23, 1998. URL: http://www.microsoft.com/workshop/security/authcode/signfaq.asp#9, pp. 1-13.

Microsoft® Authenticode Technology, "Ensuring Accountability and Authenticity for Software Components on the Internet", Microsoft Corporation, Oct. 1996, including Abstract, Contents, Introduction and pp. 1-10.

Okamoto, E. et al., "ID-Based Authentication System for Computer Virus Detection", IEEE/IEE Electronic Library online, Electronics Letters, vol. 26, Issue 15, ISSN 0013-5194, Jul. 19, 1990, Abstract and pp. 1169-1170. URL: http://iel.ihs.com:80/cgi-bin/iel_cgi?se...2ehts%26ViewTemplate%3ddocview%5fb%2ehts.

Omura, J. K., "Novel Applications of Cryptography in Digital Communications", IEEE Communications Magazine, May 1990; pp. 21-29.

Schmitt, D.A., ".EXE files, OS-2 style" PC Tech Journal, v6, n11, p. 76 (13).

Zhang, X.N., "Secure Code Distribution", IEEE/IEE Electronic Library online, Computer, vol. 30, Issue 6, Jun. 1997, pp. 76-79.

International Search Report for Application No. PCT/IL05/00915, 4 pp., dated Mar. 3, 2006.

Zhong, et al., "Security in the Large: is Java's Sandbox Scalable," *Seventh IEEE Symposium on Reliable Distributed Systems*, pp. 1-6, Oct. 1998.

Rubin, et al., "Mobile Code Security," *IEEE Internet*, pp. 30-34, Dec. 1998.

Schmid, et al. "Protecting Data From Malicious Software," *Proceeding of the 18th Annual Computer Security Applications Conference*, pp. 1-10, 2002.

Corradi, et al., "A Flexible Access Control Service for Java Mobile Code," *IEEE*, pp. 356-365, 2000.

International Search Report for Application No. PCT/IB97/01626, 3 pp., May 14, 1998 (mailing date).

Written Opinion for Application No. PCT/IL05/00915, 5 pp., dated Mar. 3, 2006 (mailing date).

International Search Report for Application No. PCT/IB01/01138, 4 pp., Sep. 20, 2002 (mailing date).

International Preliminary Examination Report for Application No. PCT/IB01/01138, 2 pp., dated Dec. 19, 2002.

* cited by examiner

METHOD AND SYSTEM FOR ADAPTIVE RULE-BASED CONTENT SCANNERS

CROSS REFERENCES TO RELATED APPLICATIONS

This application is a continuation-in-part of assignee's application U.S. Ser. No. 09/539,667, filed on Mar. 30, 2000, now U.S. Pat. No. 6,804,780, entitled "System and Method for Protecting a Computer and a Network from Hostile Downloadables," which is a continuation of assignee's patent application U.S. Ser. No. 08/964,388, filed on 6 Nov. 1997, now U.S. Pat. No. 6,092,194, also entitled "System and Method for Protecting a Computer and a Network from Hostile Downloadables."

FIELD OF THE INVENTION

The present invention relates to network security, and in particular to scanning of mobile content for exploits.

BACKGROUND OF THE INVENTION

Conventional anti-virus software scans a computer file system by searching for byte patterns, referred to as signatures that are present within known viruses. If a virus signature is discovered within a file, the file is designated as infected.

Content that enters a computer from the Internet poses additional security threats, as such content executes upon entry into a client computer, without being saved into the computer's file system. Content such as JavaScript and VBScript is executed by an Internet browser, as soon as the content is received within a web page.

Conventional network security software also scans such mobile content by searching for heuristic virus signatures. However, in order to be as protective as possible, virus signatures for mobile content tend to be over-conservative, which results in significant over-blocking of content. Over-blocking refers to false positives; i.e., in addition to blocking of malicious content, prior art technologies also block a significant amount of content that is not malicious.

Another drawback with prior art network security software is that it is unable to recognize combined attacks, in which an exploit is split among different content streams. Yet another drawback is that prior art network security software is unable to scan content containers, such as URI within JavaScript.

All of the above drawbacks with conventional network security software are due to an inability to diagnose mobile code. Diagnosis is a daunting task, since it entails understanding incoming byte source code. The same malicious exploit can be encoded in an endless variety of ways, so it is not sufficient to look for specific signatures.

Nevertheless, in order to accurately block malicious code with minimal over-blocking, a thorough diagnosis is required.

SUMMARY OF THE DESCRIPTION

The present invention provides a method and system for scanning content that includes mobile code, to produce a diagnostic analysis of potential exploits within the content. The present invention is preferably used within a network gateway or proxy, to protect an intranet against viruses and other malicious mobile code.

The content scanners of the present invention are referred to as adaptive rule-based (ARB) scanners. An ARB scanner is able to adapt itself dynamically to scan a specific type of content, such as inter alia JavaScript, VBScript, URI, URL and HTML. ARB scanners differ from prior art scanners that are hard-coded for one particular type of content. In distinction, ARB scanners are data-driven, and can be enabled to scan any specific type of content by providing appropriate rule files, without the need to modify source code. Rule files are text files that describe lexical characteristics of a particular language. Rule files for a language describe character encodings, sequences of characters that form lexical constructs of the language, referred to as tokens, patterns of tokens that form syntactical constructs of program code, referred to as parsing rules, and patterns of tokens that correspond to potential exploits, referred to as analyzer rules. Rules files thus serve as adaptors, to adapt an ARB content scanner to a specific type of content.

The present invention also utilizes a novel description language for efficiently describing exploits. This description language enables an engineer to describe exploits as logical combinations of patterns of tokens.

Thus it may be appreciated that the present invention is able to diagnose incoming content. As such, the present invention achieves very accurate blocking of content, with minimal over-blocking as compared with prior art scanning technologies.

There is thus provided in accordance with a preferred embodiment of the present invention a method for scanning content, including identifying tokens within an incoming byte stream, the tokens being lexical constructs for a specific language, identifying patterns of tokens, generating a parse tree from the identified patterns of tokens, and identifying the presence of potential exploits within the parse tree, wherein said identifying tokens, identifying patters of tokens, and identifying the presence of potential exploits are based upon a set of rules for the specific language.

There is moreover provided in accordance with a preferred embodiment of the present invention a system for scanning content, including a tokenizer for identifying tokens within an incoming byte stream, the tokens being lexical constructs for a specific language, a parser operatively coupled to the tokenizer for identifying patterns of tokens, and generating a parse tree therefrom, and an analyzer operatively coupled to the parser for analyzing the parse tree and identifying the presence of potential exploits therewithin, wherein the tokenizer, the parser and the analyzer use a set of rules for the specific language to identify tokens, patterns and potential exploits, respectively.

There is further provided in accordance with a preferred embodiment of the present invention a computer-readable storage medium storing program code for causing a computer to perform the steps of identifying tokens within an incoming byte stream, the tokens being lexical constructs for a specific language, identifying patterns of tokens, generating a parse tree from the identified patterns of tokens, and identifying the presence of potential exploits within the parse tree, wherein said identifying tokens, identifying patters of tokens, and identifying the presence of potential exploits are based upon a set of rules for the specific language.

There is yet further provided in accordance with a preferred embodiment of the present invention a method for scanning content, including expressing an exploit in terms of patterns of tokens and rules, where tokens are lexical constructs of a specific programming language, and rules are sequences of tokens that form programmatical constructs, and parsing an incoming byte source to determine if an exploit is present therewithin, based on said expressing.

There is additionally provided in accordance with a preferred embodiment of the present invention a system for scanning content, including a parser for parsing an incoming byte source to determine if an exploit is present therewithin, based on a formal description of the exploit expressed in terms of patterns of tokens and rules, where tokens are lexical constructs of a specific programming language, and rules are sequences of tokens that form programmatical constructs.

There is moreover provided in accordance with a preferred embodiment of the present invention a computer-readable storage medium storing program code for causing a computer to perform the steps of expressing an exploit in terms of patterns of tokens and rules, where tokens are lexical constructs of a specific programming language, and rules are sequences of tokens that form programmatical constructs, and parsing an incoming byte source to determine if an exploit is present therewithin, based on said expressing.

BRIEF DESCRIPTION OF THE DRAWINGS

The present invention will be more fully understood and appreciated from the following detailed description, taken in conjunction with the drawings in which.

LIST OF APPENDICES

Appendix A is a source listing of an ARB rule file for the JavaScript language, in accordance with a preferred embodiment of the present invention.

DETAILED DESCRIPTION

The present invention concerns scanning of content that contains mobile code, to protect an enterprise against viruses and other malicious code.

Figure 1:
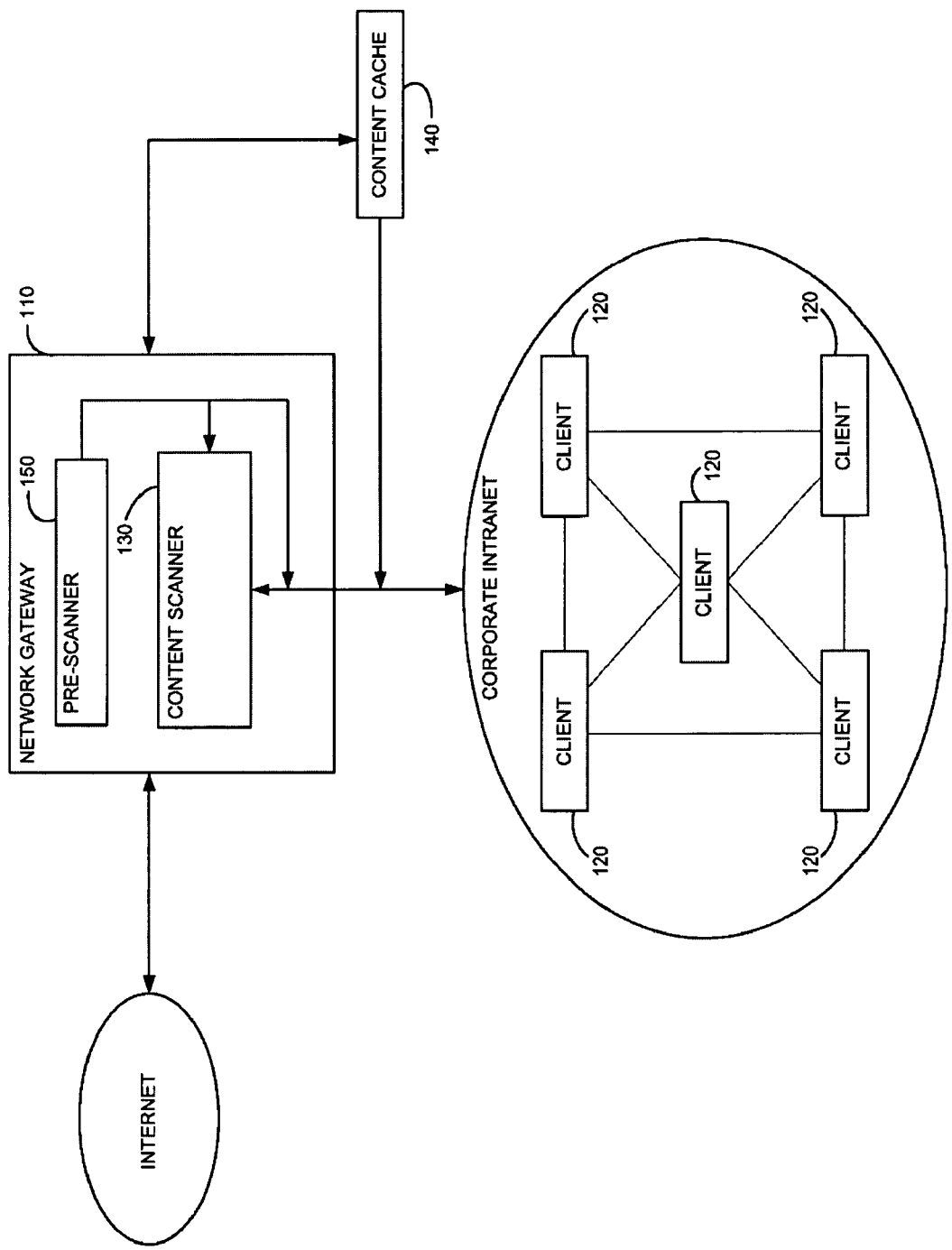
FIG. 1 is a simplified block diagram of an overall gateway security system that uses an adaptive rule-based (ARB) content scanner, in accordance with a preferred embodiment of the present invention.

Reference is now made to FIG. 1, which is a simplified block diagram of an overall gateway security system that uses an adaptive rule-based (ARB) content scanner, in accordance with a preferred embodiment of the present invention. Shown in FIG. 1 is a network gateway 110 that acts as a conduit for content from the Internet entering into a corporate intranet, and for content from the corporate intranet exiting to the Internet. One of the functions of network gateway 110 is to protect client computers 120 within the corporate intranet from malicious mobile code originating from the Internet. Mobile code is program code that executes on a client computer. Mobile code can take many diverse forms, including inter alia JavaScript, Visual Basic script, HTML pages, as well as a Uniform Resource Identifier (URI).

Mobile code can be detrimental to a client computer. Mobile code can access a client computer's operating system and file system, can open sockets for transmitting data to and from a client computer, and can tie up a client computer's processing and memory resources. Such malicious mobile code cannot be detected using conventional anti-virus scanners, which scan a computer's file system, since mobile code is able to execute as soon as it enters a client computer from the Internet, before being saved to a file.

Many examples of malicious mobile code are known today. Portions of code that are malicious are referred to as exploits. For example, one such exploit uses JavaScript to create a window that fills an entire screen. The user is then unable to access any windows lying underneath the filler window. The following sample code shows such an exploit.

```
<!DOCTYPE HTML PUBLIC "-//W3C//DTD HTML 4.0 Transitional//EN">
<HTML>
<HEAD>
<TITLE>BID-3469</TITLE>
<SCRIPT>
  op=window.createPopup( );
  s='<body>foobar</body>';
  op.document.body.innerHTML=s;
  function oppop( )
  {
    if (!op.isOpen)
    {
      w = screen.width;
      h = screen.height;
      op.show(0,0,w,h,document.body);
    }
  }
  function doit ( )
  {
    oppop( );
    setInterval("window.focus( ); {oppop( );}",10);
  }
</SCRIPT>
</HEAD>
<BODY>
<H1>BID-3469</H1>
<FORM method=POST action="">
<INPUT type="button" name="btnDoIt" value="Do It" onclick="doit( )">
</FORM>
</BODY>
</HTML>
```

Thus it may be appreciated that the security function of network gateway 110 is critical to a corporate intranet.

In accordance with a preferred embodiment of the present invention, network gateway 110 includes a content scanner 130, whose purpose is to scan mobile code and identify potential exploits. Content scanner 130 receives as input content containing mobile code in the form of byte source, and generates a security profile for the content. The security profile indicates whether or not potential exploits have been discovered within the content, and, if so, provides a diagnostic list of one or more potential exploits and their respective locations within the content.

Preferably, the corporate intranet uses a security policy to decide whether or not to block incoming content based on the content's security profile. For example, a security policy may block content that may be severely malicious, say, content that accesses an operating system or a file system, and may permit content that is less malicious, such as content that can consume a user's computer screen as in the example above. The diagnostics within a content security profile are compared with the intranet security policy, and a decision is made to allow or block the content. When content is blocked, one or more alternative actions can be taken, such as replacing suspicious portions of the content with innocuous code and allowing the modified content, and sending a notification to an intranet administrator.

Scanned content and their corresponding security profiles are preferably stored within a content cache 140. Preferably, network gateway 110 checks if incoming content is already resident in cache 140, and, if so, bypasses content scanner 130. Use of cache 140 saves content scanner 130 the task of re-scanning the same content.

Alternatively, a hash value of scanned content, such as an MD5 hash value, can be cached instead of caching the content itself. When content arrives at scanner 130, preferably its hash value is computed and checked against cached hash values. If a match is found with a cached hash value, then the content does not have to be re-scanned and its security profile can be obtained directly from cache.

Consider, for example, a complicated JavaScript file that is scanned and determined to contain a known exploit therewithin. An MD5 hash value of the entire JavaScript file can be stored in cache, together with a security profile indicating that the JavaScript file contains the known exploit. If the same JavaScript file arrives again, its hash value is computed and found to already reside in cache. Thus, it can immediately be determined that the JavaScript file contains the known exploit, without re-scanning the file.

It may be appreciated by those skilled in the art that cache 140 may reside at network gateway 110. However, it is often advantageous to place cache 140 as close as possible to the corporate intranet, in order to transmit content to the intranet as quickly as possible. However, in order for the security profiles within cache 140 to be up to date, it is important that network gateway 110 notify cache 140 whenever content scanner 130 is updated. Updates to content scanner 130 can occur inter alia when content scanner 130 is expanded (i) to cover additional content languages; (ii) to cover additional exploits; or (iii) to correct for bugs.

Preferably, when cache 140 is notified that content scanner 130 has been updated, cache 140 clears its cache, so that content that was in cache 140 is re-scanned upon arrival at network gateway 110.

Also, shown in FIG. 1 is a pre-scanner 150 that uses conventional signature technology to scan content. As mentioned hereinabove, pre-scanner 150 can quickly determine if content is innocuous, but over-blocks on the safe side. Thus pre-scanner 150 is useful for recognizing content that poses no security threat. Preferably, pre-scanner 150 is a simple signature matching scanner, and processes incoming content at a rate of approximately 100 mega-bits per second. ARB scanner 130 performs much more intensive processing than pre-scanner 150, and processes incoming content at a rate of approximately 1 mega-bit per second.

In order to accelerate the scanning process, pre-scanner 150 acts as a first-pass filter, to filter content that can be quickly recognized as innocuous. Content that is screened by pre-scanner 150 as being potentially malicious is passed along to ARB scanner 130 for further diagnosis. Content that is screened by pre-scanner 150 as being innocuous bypasses ARB scanner 130. It is expected that pre-scanner 150 filters 90% of incoming content, and that only 10% of the content requires extensive scanning by ARB scanner 130. As such, the combined effect of ARB scanner 130 and pre-scanner 150 provides an average scanning throughout of approximately 9 mega-bits per second.

Use of security profiles, security policies and caching is described in applicant's U.S. Pat. No. 6,092,194 entitled SYSTEM AND METHOD FOR PROTECTING A COMPUTER AND A NETWORK FROM HOSTILE DOWNLOADABLES, in applicant's U.S. Pat. No. 6,804,780 entitled SYSTEM AND METHOD FOR PROTECTING A COMPUTER AND A NETWORK FROM HOSTILE DOWNLOADABLES, and in applicant's U.S. Pat. No. 7,418,731 entitled METHOD AND SYSTEM FOR CACHING AT SECURE GATEWAYS.

Figure 2:
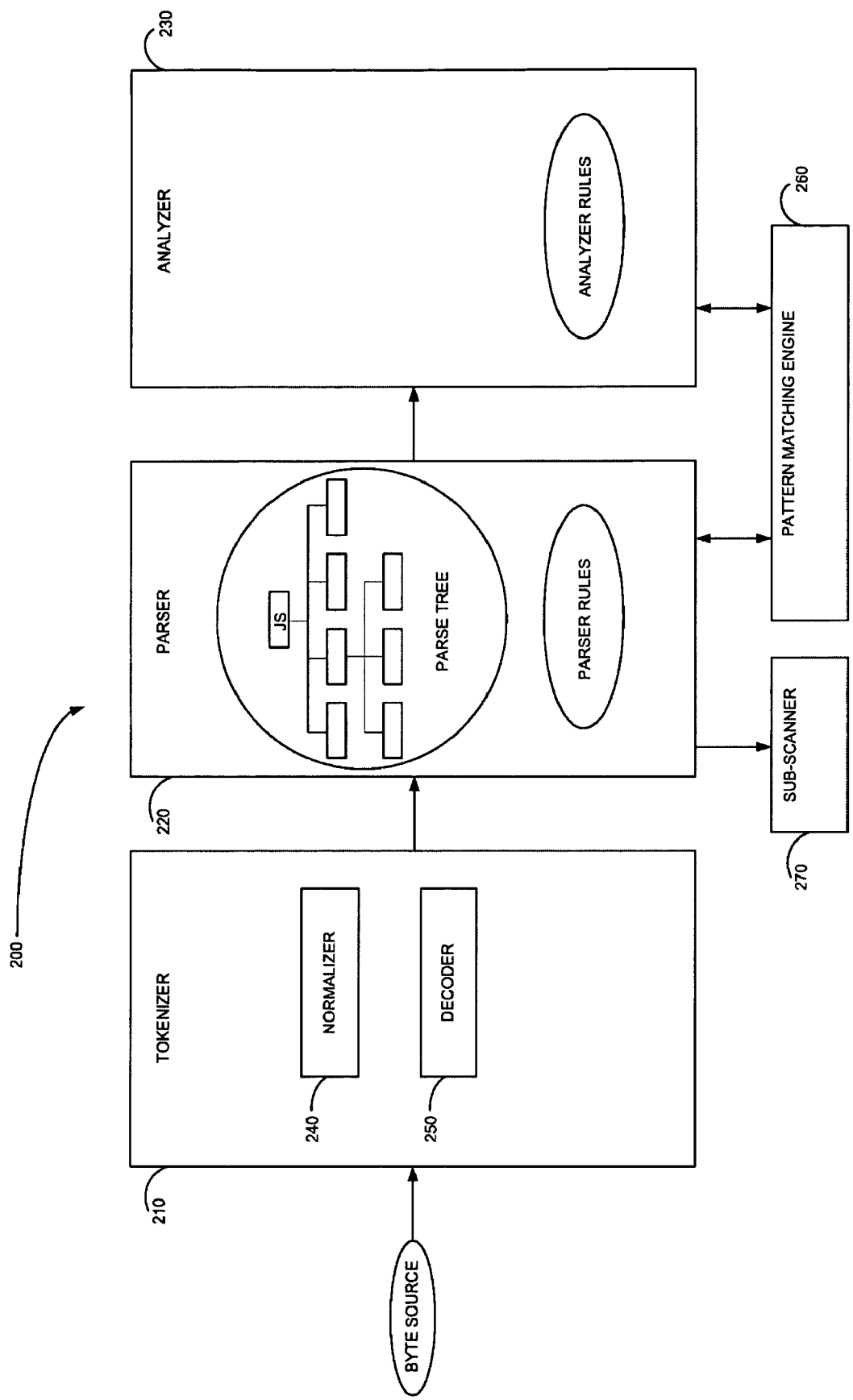
FIG. 2 is a simplified block diagram of an adaptive rule-based content scanner system, in accordance with a preferred embodiment of the present invention.

Reference is now made to FIG. 2, which is a simplified block diagram of an adaptive rule-based content scanner system 200, in accordance with a preferred embodiment of the present invention. An ARB scanner system is preferably designed as a generic architecture that is language-independent, and is customized for a specific language through use of a set of language-specific rules. Thus, a scanner system is customized for JavaScript by means of a set of JavaScript rules, and is customized for HTML by means of a set of HTML rules. In this way, each set of rules acts as an adaptor, to adapt the scanner system to a specific language. A sample rule file for JavaScript is provided in Appendix A, and is described hereinbelow.

Moreover, in accordance with a preferred embodiment of the present invention, security violations, referred to as exploits, are described using a generic syntax, which is also language-independent. It is noted that the same generic syntax used to describe exploits is also used to describe languages. Thus, referring to Appendix A, the same syntax is used to describe the JavaScript parser rules and the analyzer exploit rules.

It may thus be appreciated that the present invention provides a flexible content scanning method and system, which can be adapted to any language syntax by means of a set of rules that serve to train the content scanner how to interpret the language. Such a scanning system is referred to herein as an adaptive rule-based (ARB) scanner. Advantages of an ARB scanner, include inter alia:
  the ability to re-use software code for many different languages;
  the ability to re-use software code for binary content and EXE files;
  the ability to focus optimization efforts in one project, rather than across multiple projects; and
  the ability to describe exploits using a generic syntax, which can be interpreted by any ARB scanner.

The system of FIG. 2 includes three main components: a tokenizer 210, a parser 220 and an analyzer 230. The function of tokenizer 210 is to recognize and identify constructs, referred to as tokens, within a byte source, such as JavaScript source code. A token is generally a sequence of characters delimited on both sides by a punctuation character, such as a white space. Tokens includes inter alia language keywords, values, names for variables or functions, operators, and punctuation characters, many of which are of interest to parser 220 and analyzer 230.

Preferably, tokenizer 210 reads bytes sequentially from a content source, and builds up the bytes until it identifies a complete token. For each complete token identified, tokenizer 210 preferably provides both a token ID and the token sequence.

In a preferred embodiment of the present invention, the tokenizer is implemented as a finite state machine (FSM) that takes input in the form of character codes. Tokens for the language are encoded in the FSM as a sequence of transitions for appropriate character codes, as described hereinbelow with reference to FIG. 3. When a sequence of transitions forms a complete lexical token, a punctuation character, which normally indicates the end of a token, is expected. Upon receiving a punctuation character, the token is complete, and the tokenizer provides an appropriate ID. If a punctuation character is not received, the sequence is considered to be part of a longer sequence, and no ID is provided at this point.

Figure 3:
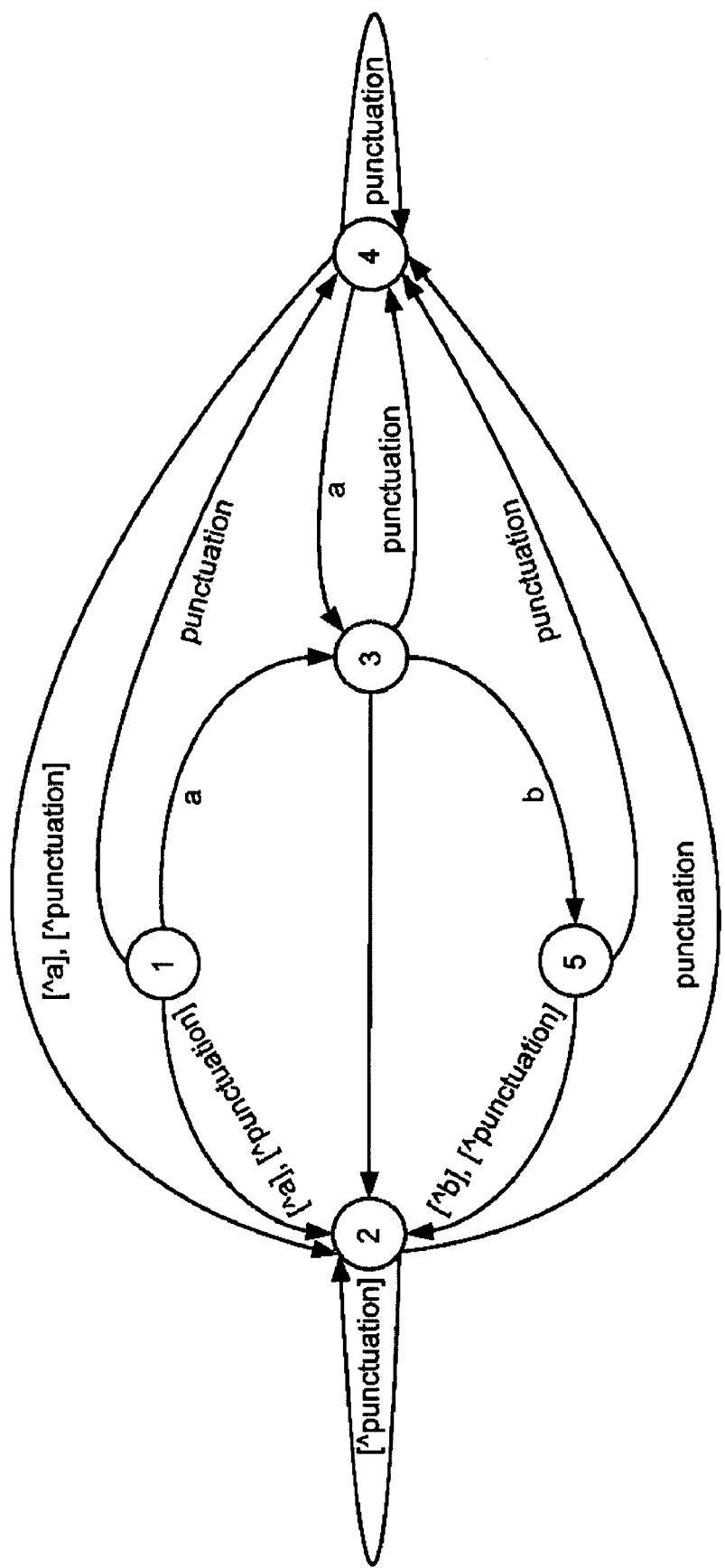
FIG. 3 is an illustration of a simple finite state machine for detecting tokens "a" and "ab", used in accordance with a preferred embodiment of the present invention.

Reference is now made to FIG. 3, which is an illustration of a simple finite state machine for detecting tokens "a" and "ab", used in accordance with a preferred embodiment of the present invention. Shown in FIG. 3 are five states, 1-5, with labeled and directed transitions therebetween. As tokenizer reads successive characters, a transition is made from a current state to a next state accordingly. State 1 is an entry state, where tokenizer 210 begins. State 4 is a generic state for punctuation. Specifically, whenever a punctuation character is encountered, a transition is made from the current state to state 4. The "a" token is identified whenever a transition is made from state 3 to state 4. Similarly, the "ab" token is identified whenever a transition is made from state 5 to state 4. A generic token, other than "a" and "ab" is identified whenever a transition is made from state 2 to state 4. A punctuation token is identified whenever a transition is made out of state 4.

Referring back to FIG. 2, tokenizer 210 preferably includes a normalizer 240 and a decoder 250. In accordance with a preferred embodiment of the present invention, normalizer 240 translates a raw input stream into a reduced set of character codes. Normalized output thus becomes the input for tokenizer 210. Examples of normalization rules includes, inter alia skipping character ranges that are irrelevant;
assigning special values to character codes that are irrelevant for the language structure but important for the content scanner;
translating, such as to lowercase if the language is case-insensitive, in order to reduce input for tokenizer 210;
merging several character codes, such as white spaces and line ends, into one; and
translating sequences of raw bytes, such as trailing spaces, into a single character code.

Preferably, normalizer 240 also handles Unicode encodings, such as UTF-8 and UTF-16.

In accordance with a preferred embodiment of the present invention, normalizer 240 is also implemented as a finite-state machine. Each successive input is either translated immediately according to normalization rules, or handled as part of a longer sequence. If the sequence ends unexpectedly, the bytes are preferably normalized as individual bytes, and not as part of the sequence.

Preferably, normalizer 240 operates in conjunction with decoder 250. Preferably, decoder 250 decodes character sequences in accordance with one or more character encoding schemes, including inter alia (i) SGML entity sets, including named sets and numerical sets; (ii) URL escape encoding scheme; (iii) ECMA script escape sequences, including named sets, octal, hexadecimal and Unicode sets; and (iv) character-encoding switches.

Preferably, decoder 250 takes normalized input from normalizer 240. In accordance with a preferred embodiment of the present invention, decoder 250 is implemented as a finite-state machine. The FSM for decoder 250 terminates when it reaches a state that produces a decoded character. If decoder 250 fails to decode a sequence, then each character is processed by tokenizer 210 individually, and not as part of the sequence. Preferably, a plurality of decoders 250 can be pipelined to enable decoding of text that is encoded by one escape scheme over another, such as text encoded with a URL scheme and then encoded with ECMA script scheme inside of JavaScript strings.

Tokenizer 210 and normalizer 240 are generic modules that can be adapted to process any content language, by providing a description of the content language within a rule file. Preferably, the rule file describes text characters used within the content language, and the composition of constructs of the content language, referred to as tokens. Tokens may include inter alia, an IDENT token for the name of a variable or function, various punctuation tokens, and tokens for keywords such as NEW, DELETE, FOR and IF. A sample rule file for JavaScript is provided in Appendix A, and is described hereinbelow.

In accordance with a preferred embodiment of the present invention, parser 220 controls the process of scanning incoming content. Preferably, parser 220 invokes tokenizer 210, giving it a callback function to call when a token is ready. Tokenizer 210 uses the callback function to pass parser 220 the tokens it needs to parse the incoming content. Preferably, parser 220 uses a parse tree data structure to represent scanned content. A parse tree contains a node for each token identified while parsing, and uses parsing rules to identify groups of tokens as a single pattern. Examples of parsing rules appear in Appendix A, and are described hereinbelow.

Preferably, the parse tree generated by parser 220 is dynamically built using a shift-and-reduce algorithm. Successive tokens provided to parser 220 by tokenizer 210 are positioned as siblings. When parser 220 discovers that a parsing rule identifies a group of siblings as a single pattern, the siblings are reduced to a single parent node by positioning a new parent node, which represents the pattern, in their place, and moving them down one generation under the new parent note.

Preferably, within the parse tree, each node contains data indicating inter alia an ID number, the token or rule that the node represents, a character string name as a value for the node, and a numerical list of attributes. For example, if the node represents an IDENT token for the name of a variable, then the value of the node is the variable name; and if the node represents a rule regarding a pattern for a function signature, then the value of the node is the function name.

In addition, whenever a parsing rule is used to recognize a pattern, information about the pattern may be stored within an internal symbol table, for later use.

In a preferred embodiment of the present invention, parsing rules are implemented as finite-state machines. These FSMs preferably return an indicator for (i) an exact match, (ii) an indicator to continue with another sibling node, or (iii) an indicator of a mis-match that serves as an exit.

More generally, parsing rules may be implemented using a hybrid mix of matching algorithms. Thus, it may use a deterministic finite automaton (DFA) for quick identification of rule candidates, and a non-deterministic finite automaton (NFA) engine for exact evaluation of the candidate rules.

In addition to a pattern, a parser rule optionally includes one or more actions to be performed if an exact pattern match is discovered. Actions that can be performed include inter alia creating a new node in the parse tree, as described hereinabove with respect to the shift and reduce algorithm; setting internal variables; invoking a sub-scanner 270, as described hereinbelow; and searching the parse tree for nodes satisfying specific conditions. By default, when the pattern within a parser rule is matched, parser 220 automatically performs a reduce operation by creating a new node and moving token nodes underneath the new node. A rule may be assigned a NoCreate attribute, in which case the default is changed to not performing the reduction operation upon a match, unless an explicit addnode command is specified in an action for the rule.

Sub-scanner 270 is another ARB scanner, similar to scanner 200 illustrated in FIG. 2 but for a different type of content. Preferably, sub-scanner 270 is used to scan a sub-section of input being processed by scanner 200. Thus, if an HTML scanner encounters a script element that contains JavaScript code, then there will be a rule in the HTML scanner whose action includes invoking a JavaScript scanner. In turn, the JavaScript scanner may invoke a URI scanner. Use of sub-scanner 270 is particularly efficient for scanning content of one type that contains content of another type embedded therein.

Preferably, immediately after parser 220 performs a reduce operation, it calls analyzer 230 to check for exploits. Analyzer 230 searches for specific patterns of content that indicate an exploit.

Preferably, parser 220 passes to analyzer 230 a newly-created parsing node. Analyzer 230 uses a set of analyzer rules to perform its analysis. An analyzer rule specifies a generic syntax pattern in the node's children that indicates a potential exploit. An analyzer rule optionally also includes one or more actions to be performed when the pattern of the rule is matched. In addition, an analyzer rule optionally includes a description of nodes for which the analyzer rule should be examined. Such a description enables analyzer 230 to skip nodes that are not to be analyzed. Preferably, rules are provided to analyzer 230 for each known exploit. Examples of analyzer rules appear in Appendix A, and are described hereinbelow.

Preferably, the nodes of the parse tree also include data for analyzer rules that are matched. Specifically, if analyzer 230 discovers that one or more analyzer rules are matched at a specific parsing tree node, then the matched rules are added to a list of matched rules stored within the node.

An advantage of the present invention is that both parser 220 and analyzer 230 use a common ARB regular expression syntax. As such, a common pattern matching engine 260 performs pattern matching for both parser 220 and analyzer 230. In accordance with a preferred embodiment of the present invention, pattern matching engine 260 accepts as input (i) a list of ARB regular expression elements describing a pattern of interest; and (ii) a list of nodes from the parse tree to be matched against the pattern of interest. Preferably, pattern matching engine 260 returns as output (i) a Boolean flag indicating whether or not a pattern is matched; and (ii) if the pattern is matched, positional variables that match grouped portions of the pattern. For example, if a pattern "(IDENT) EQUALS NUMBER" is matched, then $1 is preferably set to a reference to the nodes involved in the IDENT token. That is, if a matched pattern is "(1 2 3) 4 5", then $1 refers to the nodes 1, 2 and 3 as a single group.

Figure 4:
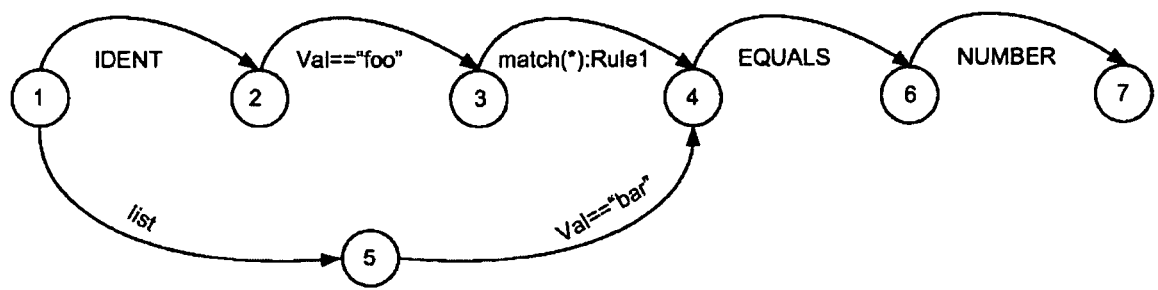
FIG. 4 is an illustration of a simple finite state machine for a pattern, used in accordance with a preferred embodiment of the present invention.

Preferably, the ARB regular expression that is input to pattern matching engine 260 is pre-processed in the form of a state machine for the pattern. Reference is now made to FIG. 4, which is an illustration of a simple finite state machine, used in accordance with a preferred embodiment of the present invention, for a pattern, (IDENT<val=="foo" & match(*):Rule1>|List <val=="bar">) EQUALS NUMBER Specifically, the pattern of interest specifies either an IDENT token with value "foo" and that matches Rule1, or a List with value "bar", followed by an EQUALS token and a NUMBER token.

Reference is now made to Appendix A, which is a source listing of an ARB rule file for the JavaScript language, in accordance with a preferred embodiment of the present invention. The listing in Appendix A is divided into six main sections, as follows: (i) vchars, (ii) tokens, (iii) token_pairs, (iv) attribs, (v) parser_rules and (vi) analyzer_rules.

The vchars section includes entries for virtual characters. Each such entry preferably conforms to the syntax

```
vchar vchar-name [action=string] (char|hex-num)
{
    vchar-pattern*
}
```

For example, the entry

```
vchar nl 0x0d
{
    [0x0d]+;
    [0x0a]+
}
``` converts a sequence of one or more CRs (carriage-returns) and a sequence of one or more LFs (line-feeds) to a newline meta-character.

The vchars section also includes entries for aliases, which are names for special virtual characters. Each such entry preferably conforms to the syntax

```
vchar_alias vchar-name
{
    hex-num
}
```

For example, the entry

```
Vchar_alias underscore
{
    0x5F;
}
``` identifies the hexadecimal number 0x5F with the name "underscore".

The tokens section includes entries for language tokens for a scanner language; namely, JavaScript for Appendix A. Each such entry preferably conforms to the syntax

```
token-entry* (cdata);
```

For example, the entry

```
LBRACE "[!left_curly_bracket!]" punct;
``` defines identifies a punctuation token, LBRACE, as a "left_curly_bracket", which is an alias for 0x7B as defined in the previous vchars section. Note that aliases are preferably surrounded by exclamation points.

A CDATA token, for identifying strings or commented text, preferably conforms to the syntax "start" "end" ["escape-pattern"] "skip-pattern";

For example, the entry

DOUBLE_QUOTE DOUBLE_QUOTE "[!backslash!][!double_quote!]?" "[^ [!backslash!][!double_quote!]]+";

identifies a string as beginning and ending with a DOUBLE-QUOTE token, as previously defined, with an escape pattern that has a "backslash" followed by zero or one "double_quote", and a skip pattern that has one or more characters other than "backslash" and "double_quote".

The token pairs section defines tokens that can validly appear in juxtaposition, and tokens that cannot validly appear in juxtaposition, in conformance with the language rules. Generally, when the tokenizer encounters an invalid juxtaposition, it inserts a virtual semi-colon. An entry for a token-pair preferably conforms to the syntax {valid | invalid} [(| token-ID | token-ID]* [)]
[(| token-ID | token-ID]* [)];

For example, the entry invalid IF (ELSE | FOR | WHILE | DOT);

indicates that an IF token cannot validly be followed by an ELSE, FOR, WHILE or DOT token. Thus, if an IF token followed by an ELSE, FOR, WHILE, or DOT token is encountered in the input, tokenizer 210 will insert a virtual delimiter character between them.

The parser-rules section has entries defining rules for the parser. Such entries preferably conform to the syntax rule rule-name [nonode] [noanalyze] [nomatch]
{
  [patterns
  {
    ID-pattern*;
  }]
  [actions
  {
    action*;
  }]
}

A pattern is a regular expression of IDs, preferably conforming to the syntax $ID_1\text{-expr } ID_2\text{-expr } \ldots ID_n\text{-expr}$ Preferably, ID-expr is one of the following:

ID
(ID [ID]*)
ID <val==val>
ID <id==rule-ID>
ID <match(n) : rule-ID>
ID <match(*) : rule-ID>
ID <match (m,n) : rule-ID>

The modifiers '*', '+', '?', '{m}' and '{m,n}' are used conventionally as follows:

| | |
|---|---|
| '*' | zero or more occurrences |
| '+' | one or more occurrences |
| '?' | zero or one occurrence |
| '{m}' | exactly m occurrences |
| '{m,n}' | between m and n occurrences, inclusive |

For example, the pattern in the rule for FuncSig (FUNCTION) (IDENT?) (List)

describes a keyword "function", followed by zero or one IDENT token, and followed by a "List". In turn, the pattern in the rule for List (LPAREN) ((Expr) (COMMA Expr)*)? (RPAREN)

describes a LPAREN token and a RPAREN token surrounding a list of zero or more Expr's separated by COMMA tokens. In turn, the pattern in the rule for Expr ([ExprDelimTokens ExprLdelimTokens ExprLdelimRules]?
([^ ExprDelimTokens ExprLdelimTokens ExprLdelimRules
ExprExcludeRules
ExprRdelimTokens]+) [ExprDelimTokens ExprRdelimTokens]) |
([ExprStmntRules]);

describes a general definition of what qualifies as an expression, involving delimiter tokens and other rules.

An action prescribes an action to perform when a pattern is matched. For example, the action in the rule for FuncSig this.val=$(2).val;
@("FUNCNAME").val=$(2).val;

assigns a value to FuncSig, which is the value of the second parameter in the pattern for FuncSig; namely, the value of the IDENT token. In addition, the action assigns this same value to an entry in a symbol table called "FUNCNAME", as described hereinbelow. It may thus be appreciated that certain rules have values associated therewith, which are assigned by the parser as it processes the tokens.

The symbol table mentioned hereinabove is an internal table, for rules to store and access variables.

The analyzer-rules section has entries defining rules for the parser. Such entries preferably conform to the syntax

```
rule rule-name [nonode] [noanalyze] [nomatch]
{
  [nodes
  {
    ID-pattern;
  }]
  [patterns
  {
    ID-pattern*;
  }]
  [actions
  {
    action*;
  }]
}
```

Patterns and actions for analyzer rules are similar to patterns and actions for parser rules. For example, the pattern

```
(IDENT) ASSIGNMENT IDENT <val=="screen"> DOT
IDENT <val=="width">;
``` within the rule for ScrWidAssign describes a five-token pattern; namely, (i) an IDENT token, followed by (ii) an ASSIGNMENT token, followed by (iii) an IDENT token that has a value equal to "screen", followed by (iv) a DOT token, and followed by (v) an IDENT token that has a value equal to "width". Such a pattern indicates use of a member reference "screen.width" within an assignment statement, and corresponds to the example exploit listed above in the discussion of FIG. 1.

The action

```
@($(1).val).attr += ATTR_SCRWID;
``` within the ScrWidAssign rule assigns the attribute ATTR_SCRWID to the symbol table entry whose name is the value of the IDENT token on the left side of the pattern.

Similarly, the pattern

```
(IDENT) ASSIGNMENT IDENT <@(val).attr?=ATTR_WINDOW>
                DOT FuncCall <val=="createPopup"> $;
``` in the rule for CreatePopup1 corresponds to the command

```
op=window.createPopup( );
``` in the example exploit above. It may thus be appreciated that exploits are often described in terms of composite pattern matches, involving logical combinations of more than one pattern.

Node patterns within analyzer rules preferably specify nodes for which an analyzer rule should be evaluated. Node patterns serve to eliminate unnecessary analyses.

Referring back to FIG. 2, when parser 220 finds a pattern match for a specific parser rule, it preferably creates a node in the parse tree, and places the matching nodes underneath the newly created node. Preferably, parser 220 assigns the name of the specific rule to the name of the new node. However, if the rule has a "nonode" attribute, then such new node is not created.

After performing the actions associated with the specific rule, parser 220 preferably calls analyzer 230, and passes it the newly-created parser node of the parse tree. However, if the rule has a "noanalyzer" attribute, then analyzer 230 is not called.

When analyzer 230 finds a pattern match for a specific analyzer rule, it preferably adds the matched rule to the parse tree. However, if the rule has a "nomatch" attribute, then the matched rule is not added to the parser tree.

Figure 5:
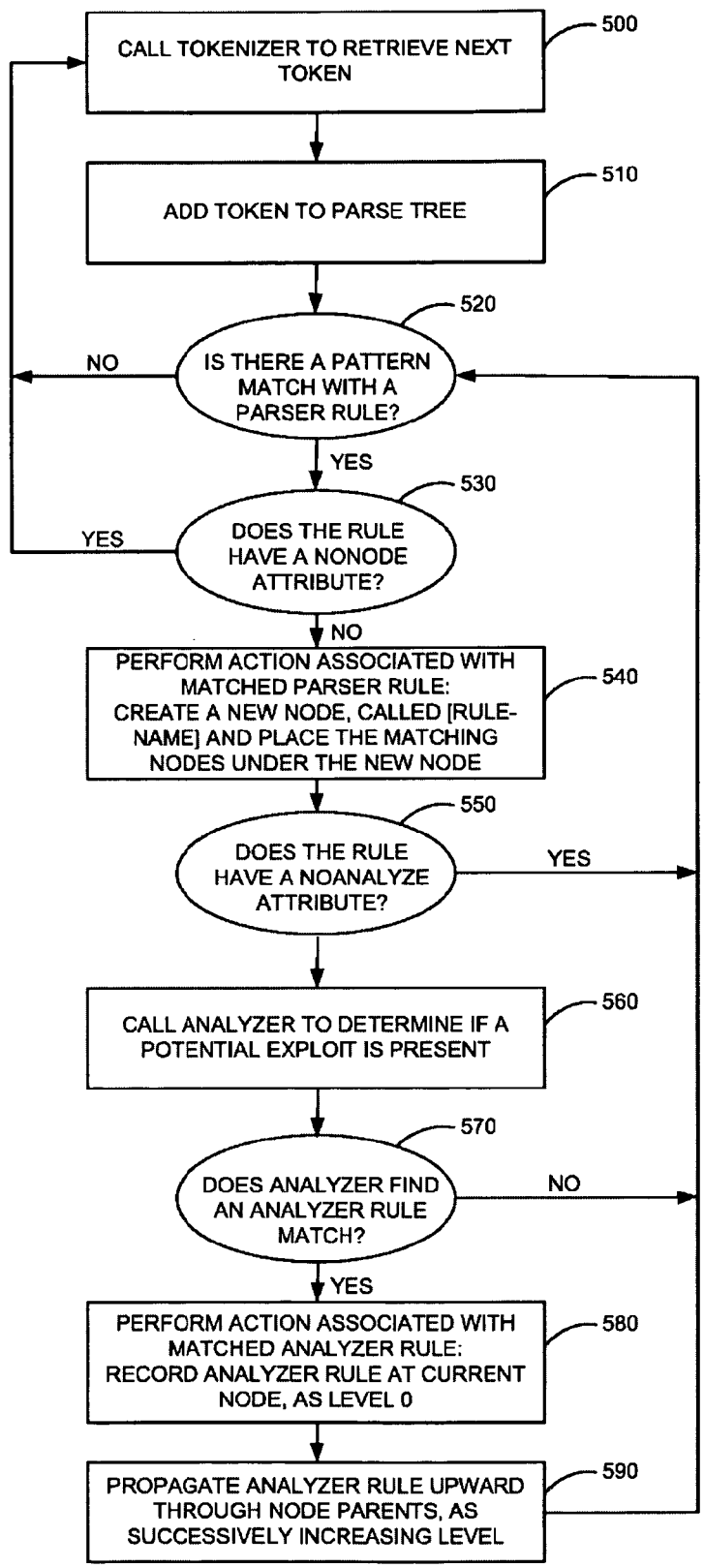
FIG. 5 is a simplified flowchart of operation of a parser for a specific content language within an ARB content scanner, in accordance with a preferred embodiment of the present invention.

Reference is now made to FIG. 5, which is a simplified flowchart of operation of a parser for a specific content language, such as parser 220 (FIG. 2), within an ARB content scanner, such as content scanner 130 (FIG. 1), in accordance with a preferred embodiment of the present invention. Prior to beginning the flowchart in FIG. 5, it is assumed that the parser has initialized a parse tree with a root node. At step 500, the parser calls a tokenizer, such as tokenizer 210, to retrieve a next token from an incoming byte stream. At step 510 the parser adds the token retrieved by the tokenizer as a new node to a parse tree. Preferably, new nodes are added as siblings until a match with a parser rule is discovered.

Nodes within the parse tree are preferably named; i.e., they have an associated value that corresponds to a name for the node. Preferably, new nodes added as siblings are named according to the name of the token they represent.

At step 520 the parser checks whether or not a pattern is matched, based on parser rules within a rule file for the specific content language. If not, then control returns to step 500, for processing the next token. If a match with a parser rule is discovered at step 520, then at step 530 the parser checks whether or not the matched parser rule has a "nonode" attribute. If so, then control returns to step 500. If the matched parser rule does not have a "nonode" attribute, then at step 540 the parser performs the matched parser rule's action. Such action can include inter alia creation of a new node, naming the new node according to the matched parser rule, and placing the matching nodes underneath the new node, as indicated at step 540. Thus it may be appreciated that nodes within the parse tree have names that correspond either to names of tokens, or names of parser rules.

At step 550 the parser checks whether or not the matched parser rule has a "noanalyze" attribute. If so, then control returns to step 520. If the matched parser rule does not have a "noanalyze" attribute, then at step 560 the parser calls an analyzer, such as analyzer 230, to determine if a potential exploit is present within the current parse tree. It may thus be appreciated that the analyzer is called repeatedly, while the parse tree is being dynamically built up.

After checking the analyzer rules, the analyzer returns its diagnostics to the parser. At step 570 the parser checks whether or not the analyzer found a match for an analyzer rule. If not, then control returns to step 500. If the analyzer did find a match, then at step 580 the parser performs the matched analyzer rule's action. Such action can include inter alia recording the analyzer rule as data associated with the current node in the parse tree; namely, the parent node that was created at step 540, as indicated at step 580.

Figure 6:
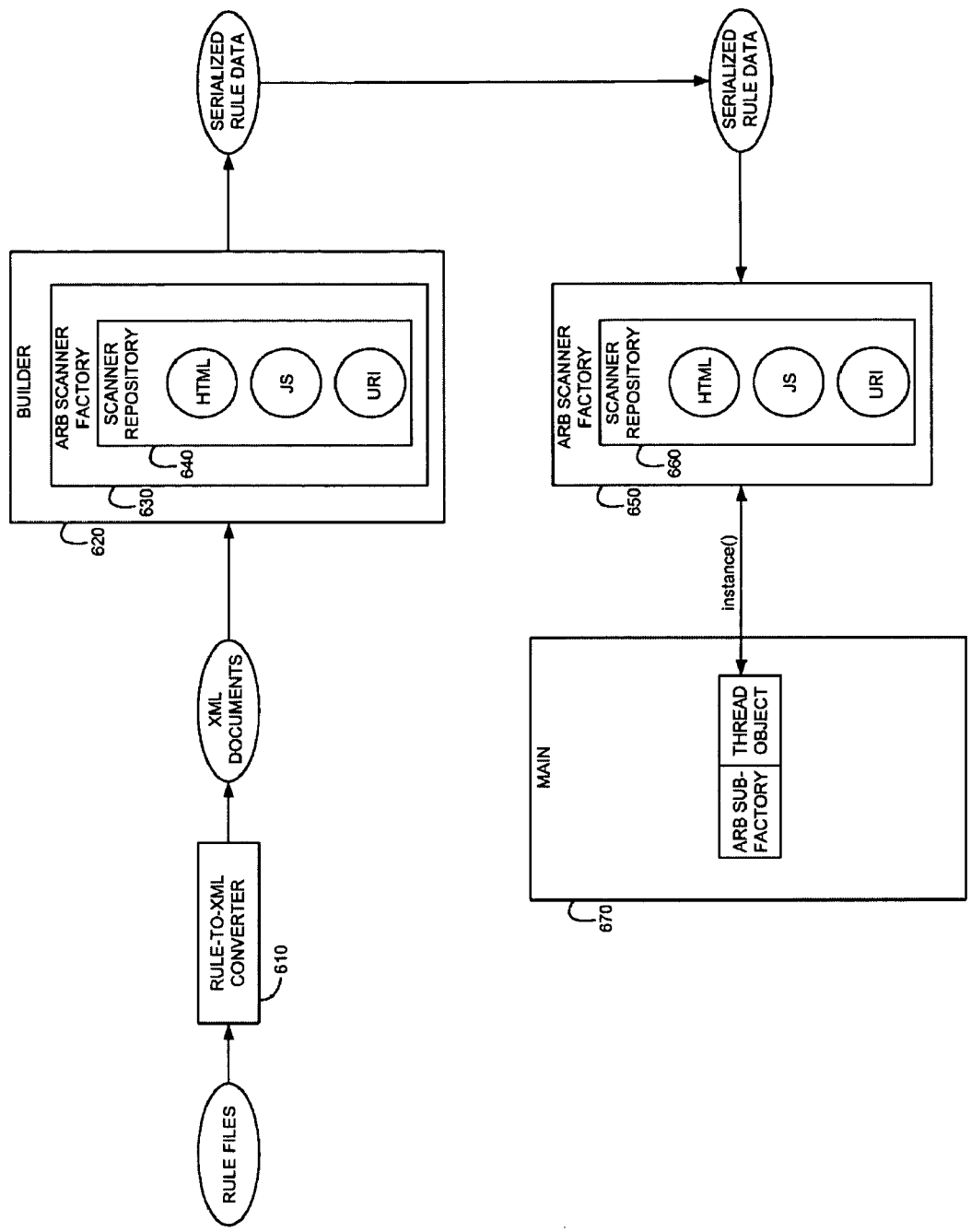
FIG. 6 is a simplified block diagram of a system for serializing binary instances of ARB content scanners, transmitting them to a client site, and regenerating them back into binary instances at the client site, in accordance with a preferred embodiment of the present invention.

In accordance with a preferred embodiment of the present invention, binary class instances of ARB scanners are packaged serially, for transmission to and installation at a client site. Reference is now made to FIG. 6, which is a simplified block diagram of a system for serializing binary instances of ARB content scanners, transmitting them to a client site, and regenerating them back into binary instances at the client site. The workflow in FIG. 6 begins with a set of rule files for one or more content languages. Preferably, the rule files are generated by one or more people who are familiar with the content languages.

A rule-to-XML convertor 610 converts rule files from ARB syntax into XML documents, for internal use. Thereafter a builder module 620 is invoked. Preferably, builder module 620 generates a serialized rule data file, referred to herein as an archive file.

In turn, ARB scanner factory module 630 is responsible for producing an ARB scanner on demand. Preferably, an ARB scanner factory module has a public interface as follows:

```
class arbScannerFactory
{
    INT32 createScanner(const std::string& mimeType,
    arbScanner** scanner);
    INT32 retireScanner(arbScanner *scanner, INT32&
    factoryStillActive);
    Bool hasScannerType(const std::string& mimeType);
}
```

ARB scanner factory module 630 is also responsible for pooling ARB scanners for later re-use.

ARB scanner factory module 630 instantiates a scanner repository 640. Repository 640 produces a single instance of each ARB scanner defined in the archive file. Preferably, each instance of an ARB scanner is able to initialize itself and populate itself with the requisite data.

Figure 7:
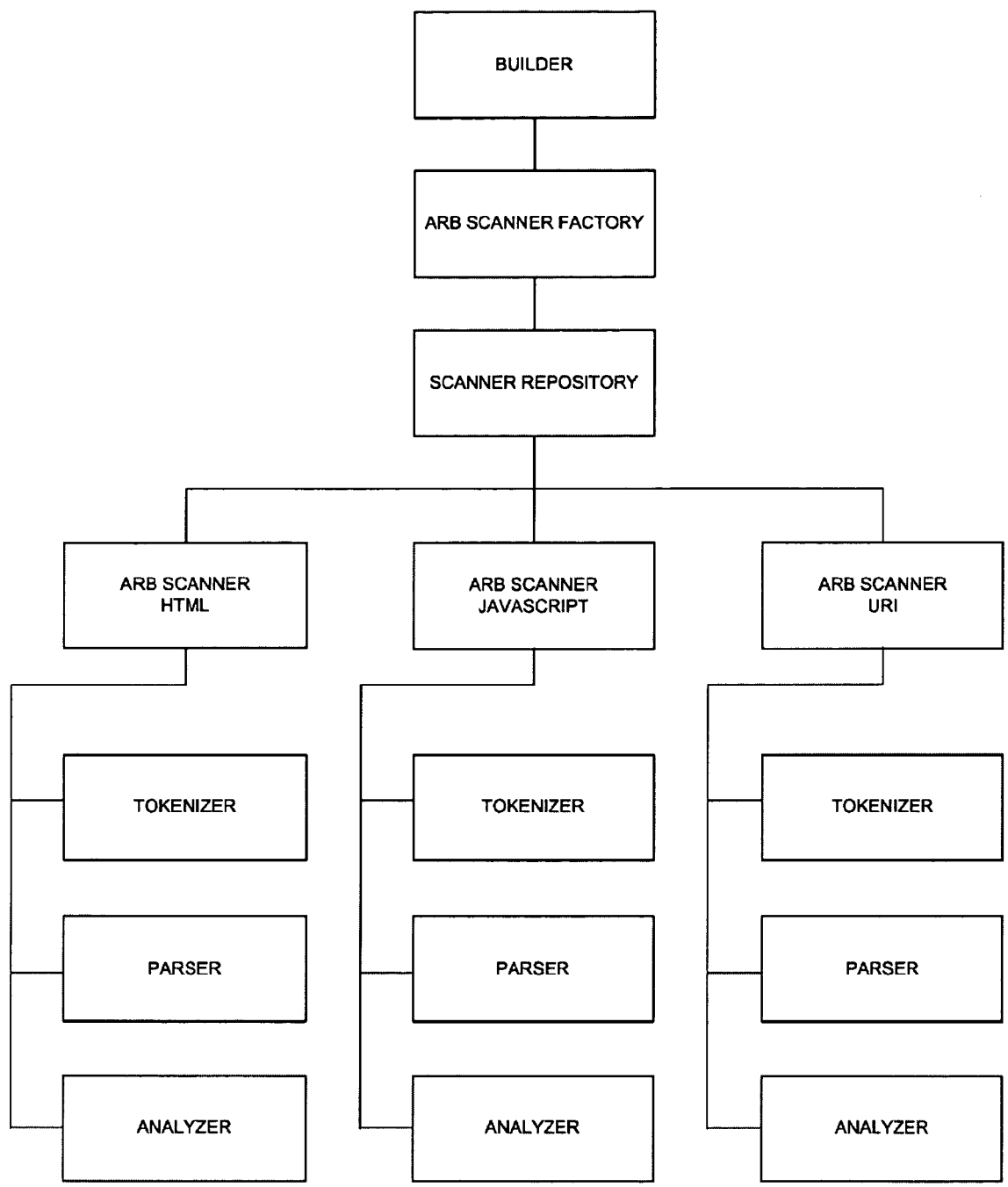
FIG. 7 illustrates a representative hierarchy of objects created by a builder module, in accordance with a preferred embodiment of the present invention.

Reference is now made to FIG. 7, which illustrates a representative hierarchy of objects created by builder module 620, in accordance with a preferred embodiment of the present invention. Shown in FIG. 7 are three types of content scanners: a scanner for HTML content, a scanner for JavaScript content, and a scanner for URI content. An advantage of the present invention is the ability to generate such a multitude of content scanners within a unified framework.

After ARB scanner factory module 630 is produced, builder module 620 calls a serialize( ) function. As such, the serialize( ) function called by builder module 620 causes all relevant classes to serialize themselves to the archive file recursively. Thereafter the archive file is sent to a client site.

After receiving the archive file, the client deserializes the archive file, and creates a global singleton object encapsulating an ARB scanner factory instance 650. The singleton is initialized by passing it a path to the archive file.

When the client downloads content from the Internet it preferably creates a pool of thread objects. Each thread object stores its ARB scanner factory instance 650 as member data. Whenever a thread object has content to parse, it requests an appropriate ARB scanner 660 from its ARB scanner factory object 650. Then, using the ARB scanner interface, the thread passes content and calls the requisite API functions to scan and process the content. Preferably, when the thread finishes scanning the content, it returns the ARB scanner instance 660 to its ARB scanner factory 650, to enable pooling the ARB scanner for later re-use.

It may be appreciated by those skilled in the art that use of archive files and scanner factories enables auto-updates of scanners whenever new versions of parser and analyzer rules are generated.

In reading the above description, persons skilled in the art will realize that there are many apparent variations that can be applied to the methods and systems described. Thus, although FIG. 5 describes a method in which a complete diagnostic of all match analyzer rules is produced, in an alternative embodiment the method may stop as soon as a first analyzer rule is matched. The parser would produce an incomplete diagnostic, but enough of a diagnostic to determine that the scanned content contains a potential exploit.

In addition to script and text files, the present invention is also applicable to parse and analyze binary content and EXE files. Tokens can be defined for binary content. Unlike tokens for text files that are generally delimited by punctuation characters, tokens for binary content generally have different characteristics.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

APPENDIX A

```
vchars
{
  vchar ignore 0x00 "ignore"
  {
    [0x00-0xFF]+;
  }
  vchar ws 0x20
  {
    [0x09 0x0B 0x0C 0x20 0xA0]+;
  }
  vchar nl 0x0d
  {
    [0x0d]+;
    [0x0a]+;
  }
  vchar alphanum '?' "raw"
  {
    [0x21-0x2f 0x30-0x39 0x3a-0x40 0x41-0x5A 0x5b-0x60 0x61-0x7A 0x7B-0x7E 0x7f-0x9F 0xA1-0xff];
  }
  vchar_alias underscore
  {
    0x5F;
  }
  vchar_alias equals
  {
    0x3D;
  }
  ...
  vchar_alias hash
  {
    0x23;
  }
  vchar_alias at
  {
    0x40;
  }
}
tokens
{
  TOKENIZER_DEFAULT    ".+";
  WS                   "[!ws!]" punct not-a-token;
  EOL                  "[!nl!]" punct not-a-token;
  IDENT                "[A-Za-z[!underscore!][!dollarsign!]][A-Za-z0-9[!underscore!][!dollarsign!]]*";
  LBRACE               "[!left_curly_bracket!]"      punct;
  RBRACE               "[!right_curly_bracket!]"     punct;
  LPAREN               "[!left_parenthesis!]"        punct;
  RPAREN               "[!right_parenthesis!]"       punct;
  LBRACKET             "[!left_square_bracket!]"     punct;
```

APPENDIX A-continued

```
    RBRACKET              "[!right_square_bracket!]"    punct;
...
    SINGLE_QUOTE          "[!single_quote!]"            punct;
    DOUBLE_QUOTE          "[!double_quote!]"            punct;
    COMMENT_OPEN          "[!slash!][!asterisk!]"       punct;
    COMMENT_CLOSE         "[!asterisk!][!slash!]"       punct;
    DOUBLE_SLASH          "[!slash!][!slash!]"          punct;
    INTEGER_DECIMAL       "[0-9]+";
    INTEGER HEX           "0[xX][0-9A-Fa-f]+";
...
    cdata CDATA
    {
        DOUBLE_QUOTE DOUBLE_QUOTE "[!backslash!]
[!double_quote!]?" "[^[!backslash!][!double_quote!]]+";
        SINGLE_QUOTE SINGLE_QUOTE "[!backslash!]
[!single_quote!]?" "[^[!backslash!][!single_quote!]]+";
        COMMENT_OPEN COMMENT_CLOSE "[ [!asterisk!]]+";
        DOUBLE_SLASH EOL "[^[!nl!]]+";
    }
    VSEMICOLON vdelim;
}
#define OP PLUS | MINUS | SLASH | MULTIPLY | MOD
token_pairs
{
    invalid IDENT IDENT;
    invalid IF(ELSE | FOR | WHILE | DOT);
    invalid (OP) (OP);
    valid (PLUS | MINUS) (PLUS | MINUS);
    invalid INTEGER_DECIMAL IDENT;
}
#define Semicolon (SEMICOLON | VSEMICOLON)
#define Semicolon_ SEMICOLON VSEMICOLON
#define ActionClause (((Expr) Semicolon) | (Block))
parser_rules
{
    rule Eval
    {
        patterns
        {
            EVAL List;
        }
    }
    rule FuncSig
    {
        patterns
        {
            (FUNCTION) (IDENT?) (List);
        }
        actions
        {
            this.val=$(2).val;
            @("FUNCNAME").val = $(2).val;
        }
    }
    rule FuncDecl
    {
        patterns
        {
            (FuncSig) Block;
        }
        actions
        {
            this.val=$(1).val;
            ~@("FUNCNAME");
        }
    }
    rule FuncCall
    {
        patterns
        {
            (IDENT) List;
        }
        actions
        {
            this.val=$(1).val;
        }
    }
...
#define ExprDelimTokens       Semicolon_ COMMA COLON
#define ExprLdelimTokens      LPAREN LBRACE ELSE DO IN
```

```
THROW RETURN CASE VAR
#define ExprRdelimTokens      RPAREN RBRACE
#define ExprLdelimRules       IfClause WhileClause ForClause
ForInClause WithClause
#define ExprExcludeRules      IfStmnt Expr
#define ExprStmntRules        FuncDecl IfElseStmnt IfNoElseStmnt
WhileStmnt DoWhileStmnt ForStmnt ForInStmnt SwitchStmnt
WithStmnt TryCatchFinallyStmnt TryCatchNoFinallyStmnt
TryNoCatchFinallyStmnt ThrowStmnt ReturnStmnt LabelStmnt
CaseStmnt DefaultStmnt BreakStmnt ContinueStmnt VarStmnt
DebuggerStmnt NakedBlockStmnt NakedListStmnt
    rule Expr nonode
    {
        patterns
        {
            (
                [ExprDelimTokens ExprLdelimTokens ExprLdelimRules]?
                ([^ ExprDelimTokens ExprLdelimTokens ExprLdelimRules
ExprExcludeRules ExprRdelimTokens]+) [ExprDelimTokens
ExprRdelimTokens] ) | ([ExprStmntRules]);
        }
        actions
        {
            addnode(children="2 3");
        }
    }
    rule BlockBegin nonode
    {
        patterns
        {
            LBRACE;
        }
        actions
        {
            @level++;
        }
    }
    rule Block
    {
        patterns
        {
            (LBRACE)(Expr Semicolon?)* (RBRACE);
        }
        actions
        {
            @level--;
        }
    }
    rule List
    {
        patterns
        {
            (LPAREN) ((Expr) (COMMA Expr)*)? (RPAREN);
        }
    }
}
analyzer_rules
{
    RULE_DECL (Begin) nomatch
    {
        patterns
        {
            BEGIN;
        }
        actions
        {
            @("window", 0).attr += ATTR_WINDOW;
            @("self", 0).attr += ATTR_WINDOW;
            @("parent", 0).attr += ATTR_WINDOW;
        }
    }
...
    RULE_DECL (ScrWidAssign)
    {
        patterns
        {
            (IDENT) ASSIGNMENT IDENT <val=="screen"> DOT IDENT
<val=="width">;
        }
        actions
```

APPENDIX A-continued

```
    {
        @($(1).val).attr += ATTR_SCRWID;
    }
}
RULE_DECL (ScrHgtAssign)
{
    patterns
    {
        (IDENT) ASSIGNMENT IDENT <val=="screen"> DOT IDENT
<val=="height">;
    }
    actions
    {
        @($(1).val).attr += ATTR_SCRHGT;
    }
}
RULE_DECL (ScrWidHgtList)
{
    patterns
    {
        LPAREN Expr COMMA Expr COMMA
            Expr <attr?=ATTR_SCRWID> COMMA
            Expr <attr?=ATTR_SCRHGT>;
    }
}
RULE_DECL (EXPLOIT) exploit
{
    patterns
    {
        . <(matches(*):RULE(CreatePopup1) &
matches(*):RULE(WndShowScrnWidHgt1)) |
            (matches(*):RULE(CreatePopup2) &
matches(*):RULE(WndShowScrnWidHgt2))>;
    }
}
RULE_DECL (CreatePopup1)
{
    patterns
    {
        (IDENT) ASSIGNMENT IDENT <@(val).attr?=
ATTR_WINDOW>
            DOT FuncCall <val=="createPopup"> $;
    }
    actions
    {
        @($(1).val).attr += ATTR_WINDOW;
    }
}
```

What is claimed is:

1. A computer processor-based multi-lingual method for scanning incoming program code, comprising:
   receiving, by a computer, an incoming stream of program code;
   determining, by the computer, any specific one of a plurality of programming languages in which the incoming stream is written;
   instantiating, by the computer, a scanner for the specific programming language, in response to said determining, the scanner comprising parser rules and analyzer rules for the specific programming language, wherein the parser rules define certain patterns in terms of tokens, tokens being lexical constructs for the specific programming language, and wherein the analyzer rules identify certain combinations of tokens and patterns as being indicators of potential exploits, exploits being portions of program code that are malicious;
   identifying, by the computer, individual tokens within the incoming stream;
   dynamically building, by the computer while said receiving receives the incoming stream, a parse tree whose nodes represent tokens and patterns in accordance with the parser rules;
   dynamically detecting, by the computer while said dynamically building builds the parse tree, combinations of nodes in the parse tree which are indicators of potential exploits, based on the analyzer rules; and
   indicating, by the computer, the presence of potential exploits within the incoming stream, based on said dynamically detecting.

2. The method of claim 1 wherein said dynamically building a parse tree is based upon a shift-and-reduce algorithm.

3. The method of claim 1 wherein the parser rules and analyzer rules include actions to be performed when rules are matched.

4. The method of claim 1 wherein the specific programming language is JavaScript.

5. The method of claim 1 wherein the specific programming language is Visual Basic VBScript.

6. The method of claim 1 wherein the specific programming language is HTML.

7. The method of claim 1 wherein the specific programming language is Uniform Resource Identifier (URI).

8. The method of claim 1 wherein the incoming stream of program code includes embedded program code, the method further comprising:
   identifying, by the computer, another one of the plurality of programming languages in which the embedded program code is written, the other programming language being different that the specific programming language in which the incoming stream is written; and
   repeating said instantiating, said identifying, said dynamically building, said dynamically detecting and said indicating for the embedded program code, based on the parser rules and the analyzer rules for the other programming language.

9. A computer system for multi-lingual content scanning, comprising:
   a non-transitory computer-readable storage medium storing computer-executable program code that is executed by a computer to scan incoming program code;
   a receiver, stored on the medium and executed by the computer, for receiving an incoming stream of program code;
   a multi-lingual language detector, stored on the medium and executed by the computer, operatively coupled to said receiver for detecting any specific one of a plurality of programming languages in which the incoming stream is written;
   a scanner instantiator, stored on the medium and executed by the computer, operatively coupled to said receiver and said multi-lingual language detector for instantiating a scanner for the specific programming language, in response to said determining, the scanner comprising:
      a rules accessor for accessing parser rules and analyzer rules for the specific programming language, wherein the parser rules define certain patterns in terms of tokens, tokens being lexical constructs for the specific programming language, and wherein the analyzer rules identify certain combinations of tokens and patterns as being indicators of potential exploits, exploits being portions of program code that are malicious;
      a tokenizer, for identifying individual tokens within the incoming;
      a parser, for dynamically building while said receiver is receiving the incoming stream, a parse tree whose nodes represent tokens and patterns in accordance with the parser rules accessed by said rules accessor; and an analyzer, for dynamically detecting, while said parser is dynamically building the parse tree, combinations of nodes in the parse tree which are indicators of potential exploits, based on the analyzer rules; and a notifier, stored on the medium and executed by the computer, operatively coupled to said scanner instantiator for indicating the presence of potential exploits within the incoming stream, based on results of said analyzer.

10. The system of claim 9 further comprising a pre-scanner for identifying program code that is innocuous and for routing the innocuous program code so as to bypass said tokenizer, said parser and said analyzer.

11. The system of claim 9 wherein said parser dynamically builds the parse tree using a shift-and-reduce algorithm.

12. The system of claim 9 wherein said parser comprises a pattern-matching engine, for matching a pattern within a sequence of tokens in accordance with the parser rules accessed by said rules accessor.

13. The system of claim 12 wherein the parser rules accessed by said rules accessor are represented as finite-state machines.

14. The system of claim 12 wherein the parser rules are represented as pattern expression trees.

15. The system of claim 12 wherein parser rules are merged into a single deterministic finite automaton (DFA).

16. The system of claim 9 wherein the parser rules and analyzer rules include actions to be performed when rules are matched.

17. The system of claim 16 further comprising a scripting engine stored on the medium and executed by the computer, operatively coupled to said parser and said analyzer, for implementing the actions to be performed.

18. The system of claim 9 wherein the specific programming language is JavaScript.

19. The system of claim 9 wherein the specific programming language is Visual Basic script.

20. The system of claim 9 wherein the specific programming language is HTML.

21. The system of claim 9 wherein the specific programming languages language is Uniform Resource Identifier (URI).

22. A non-transitory computer-readable storage medium storing program code for causing a computer to perform the steps of:

receiving an incoming stream of program code;

determining any specific one of a plurality of programming languages in which the incoming stream is written;

instantiating a scanner for the specific programming language, in response to said determining, the scanner comprising parser rules and analyzer rules for the specific programming language, wherein the parser rules define certain patterns in terms of tokens, tokens being lexical constructs for the specific programming language, and wherein the analyzer rules identify certain combinations of tokens and patterns as being indicators of corresponding exploits, exploits being portions of program code that are malicious;

identifying individual tokens within the incoming stream;

dynamically building, while said receiving receives the incoming stream, a parse tree whose nodes represent tokens and patterns in accordance with the parser rules;

dynamically detecting, while said dynamically building builds the parse tree, combinations of nodes in the parse tree which are indicator or potential exploits, based on the analyzer rules; and indicating the presence of potential exploits within the incoming stream, based on said dynamically detecting.

23. A computer processor-based multi-lingual method for scanning content incoming program code, comprising:

for each of a plurality of programming languages, expressing exploits in terms of patterns of tokens and rules, wherein exploits are portions of program code that are malicious, wherein tokens are lexical constructs of a specific programming language, and wherein rules designate certain patterns of tokens as forming programmatical constructs;

receiving, by a computer, an incoming stream of program code;

determining, by the computer, any specific one of the plurality of programming languages in which the incoming stream is written;

dynamically building, while said receiving receives the incoming stream, a parse tree whose nodes represent tokens and rules vis-à-vis the specific programming language;

dynamically detecting, while said dynamically building builds the parse tree, patterns of nodes in the parse tree which are indicators of potential exploits, based on said expressing vis-à-vis the specific programming language; and indicating, by the computer, the presence of potential exploits within the incoming stream, based on said dynamically detecting.

24. The method of claim 23 wherein said dynamically building comprises positioning nodes of the parse tree corresponding to rules as parent nodes, the children of which correspond to the tokens within the patterns that correspond to the rules.

25. The method of claim 24 wherein said dynamically building comprises adding a new parent node to the parse tree when a rule is matched.

26. The method of claim 25 wherein said dynamically detecting detects patterns of nodes in the parse tree whenever said adding adds a new parent node to the parse tree.

27. The method of claim 26 wherein tokens and rules have names associated therewith, and wherein said dynamically building comprises assigning values to nodes in the parse tree, the value of a node corresponding to a token being the name of the corresponding token, and the value of a node corresponding to a rule being the name of the corresponding rule.

28. The method of claim 27 wherein said dynamically building comprises storing an indicator for a matched rule in the new parent node of the parse tree when the rule is matched.

29. A computer system for multi-lingual content scanning, comprising:

a non-transitory computer-readable storage medium storing computer-executable program code that is executed by a computer to scan incoming program code;

an accessor, stored on the medium and executed by the computer, for accessing descriptions of exploits in terms of patterns of tokens and rules, wherein exploits are portions of program code that are malicious, wherein tokens are lexical constructs of any one of a plurality of programming languages, and wherein rules designate certain patterns of tokens as forming programmatical constructs;

a receiver, stored on the medium and executed by the computer, for receiving an incoming stream of program code;

a multi-lingual language detector, stored on the medium and executed by the computer, operatively coupled with said receiver for detecting any specific one of the plurality of programming languages in which the incoming stream is written;

a parser, stored on the medium and executed by the computer, operatively coupled with said accessor, with said receiver and with said language detector for dynamically building, while said receiver is receiving the incoming stream, a parse tree whose nodes represent tokens and rules vis-à-vis the specific programming language;

an analyzer, stored on the medium and executed by the computer, operatively coupled with said parser, with said accessor and with said language detector, for dynamically detecting, while said parser is dynamically building the parse tree, patterns of nodes in the parse tree which are indicators of potential exploits, based on the descriptions of exploits vis-à-vis the specific programming language; and a notifier, stored on the medium and executed by the computer, operatively coupled with said analyzer, for indicating the presence of potential exploits within the incoming stream, based on results of said analyzer.

30. The system of claim 29 wherein said parser positions nodes of the parse tree corresponding to rules as parent nodes, the children of which correspond to tokens within the patterns that correspond to the rules.

31. The system of claim 30 wherein said parser adds a new parent node to the parse tree when a rule is matched.

32. The medium of claim 31 wherein said analyzer dynamically detects patterns of nodes in the parse tree when said parser adds a new parent node to the parse tree.

33. The system of claim 32 wherein tokens and rules have names associated therewith, and wherein said parser assigns values to nodes in the parse tree, the value of a node corresponding to a token being the name of the corresponding token, and the value of a node corresponding to a rule being the name of the corresponding rule.

34. The system of claim 33 wherein said parser stores an indicator for a matched rule in the new parent node of the parse tree when the rule is matched.

35. A non-transitory computer-readable storage medium storing program code for causing a computer to perform the steps of:

for each of a plurality of programming languages, expressing exploits in terms of corresponding patterns of tokens and rules, wherein exploits are portions of program code that are malicious, wherein tokens are lexical constructs of a specific programming language, and wherein rules designate certain patterns of tokens as forming programmatical constructs;

receiving an incoming stream of program code;

determining any specific one of the plurality of programming languages in which the incoming stream is written;

dynamically building, while said receiving receives the incoming stream, a parse tree whose nodes correspond to tokens and rules vis-à-vis the specific programming language;

dynamically detecting, while said dynamically building builds the parse tree, patterns of nodes in the parse tree which are indicators of potential exploits, based on said expressing vis-à-vis the specific programming language; and indicating, by the computer, the presence of potential exploits within the incoming stream, based on said dynamically detecting.

* * * * *